(12) United States Patent
Edmondson et al.

(10) Patent No.: US 6,681,905 B2
(45) Date of Patent: Jan. 27, 2004

(54) MAGNETORHEOLOGICAL FLUID-CONTROLLED VEHICLE SUSPENSION DAMPER

(75) Inventors: Jeremy R. Edmondson, Canton, MI (US); Joshua D. Coombs, Whitmore Lake, MI (US); Carlos F. Osorio, Whitmore Lake, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 51 days.

(21) Appl. No.: 09/998,258

(22) Filed: Nov. 30, 2001

(65) Prior Publication Data

US 2003/0102193 A1 Jun. 5, 2003

(51) Int. Cl.⁷ ............................. F16F 15/03; F16F 9/53; F16F 13/30
(52) U.S. Cl. .................... 188/267.2; 188/290; 188/306; 188/130
(58) Field of Search ........................... 188/267.2, 267.1, 188/267, 130, 315, 290, 306; 267/140.14, 140.15, 140.12; 192/21.5; 60/326; 91/471; 16/51, 82; 248/636, 558; 482/903, 63; 464/29

(56) References Cited

U.S. PATENT DOCUMENTS

| 2,575,360 A | 11/1951 | Rabinow |
| 2,635,483 A | 4/1953 | Welsh |
| 2,661,825 A | 12/1953 | Winslow |

(List continued on next page.)

FOREIGN PATENT DOCUMENTS

| DE | 19839888 A | 3/2000 |
| EP | 1134100 A2 | 9/2001 |
| GB | 2382638 * | 6/2003 |
| JP | 1-320336 * | 12/1989 |
| RU | 1820077 * | 6/1993 |

OTHER PUBLICATIONS

Translation of SU1820077.*
Article entitled "Commercial Magneto–Rheological Fluid Devices," by J.D. Carlson, D.M. Catanzarite, and K.A. St. Clair, from Proceedings of the 5$^{th}$ International Conference on Electro–Rheological Fluids, Magneto–Rheological Suspensions and Associated Technology, Jul. 10–14, 1995, pp. 20–28.
Article entitled, "Magnetorheological Fluids: Materials, Characterization, and Devices," by Osama Ashour and Craig A. Rogers, 1996, pp. 123–130.
Article entitled, "Properties and Applications of Commercial Magnetorheological Fluids," by Mark R. Jolly, Jonathan W. Bender, and J. David Carlson, from SPIE 5$^{th}$ Annual Symposium on Smart Structures and Materials, Mar. 15, 1998.
Article entitled, "Brakes and Clutches Using ER Fluids," by Chris A. Papadopoulos, Apr. 15, 1998, pp. 719–726.
Article entitled, "Compensator–Based Position Control of an Electrorheological Actuator," by Z. B. Dlodlo and D. J. Brookfield, 1999, pp. 895–917.

(List continued on next page.)

*Primary Examiner*—Douglas C. Butler
(74) *Attorney, Agent, or Firm*—Brinks Hofer Gilson & Lione

(57) ABSTRACT

A magnetorheological fluid actuated damper. At least a first and a second cylinder with the first cylinder positioned axially within the second cylinder are provided. A gap is formed between the cylinders. The second cylinder is mounted to a stationary mount of the vehicle chassis and a control arm is mounted at an end of the first cylinder. The first cylinder is mounted on bearings to allow it to rotate relative to the chassis. The gap between the cylinders contains a magnetorheological fluid having an adjustable viscosity in reaction to the application of a magnetic field. A magnetic field is generated over the fluid in the gap.

14 Claims, 6 Drawing Sheets

U.S. PATENT DOCUMENTS

| | | |
|---|---|---|
| 2,667,237 A | 1/1954 | Rabinow |
| 2,886,151 A | 5/1959 | Winslow |
| 3,538,469 A | 11/1970 | Litte et al. |
| 4,200,003 A | 4/1980 | Miller |
| 4,503,952 A | 3/1985 | Hesse |
| 4,942,947 A | 7/1990 | Shtarkman |
| 5,257,681 A | 11/1993 | Shtarkman et al. |
| 5,277,281 A | 1/1994 | Carlson et al. |
| 5,284,330 A | 2/1994 | Carlson et al. |
| 5,390,121 A | 2/1995 | Wolfe |
| 5,396,973 A | 3/1995 | Schwemmer et al. |
| 5,398,917 A | 3/1995 | Carlson et al. |
| 5,556,083 A | 9/1996 | Furihata et al. |
| 5,645,752 A | 7/1997 | Weiss et al. |
| 5,652,704 A | 7/1997 | Catanzarite |
| 5,670,213 A | 9/1997 | Blair |
| 5,779,013 A | 7/1998 | Bansbach |
| 5,816,372 A | 10/1998 | Carlson et al. |
| 5,823,309 A | 10/1998 | Gopalswamy et al. |
| 5,829,319 A | 11/1998 | Mokeddem |
| 5,842,547 A | 12/1998 | Carlson et al. |
| 5,845,752 A | 12/1998 | Gopalswamy et al. |
| 5,900,184 A | 5/1999 | Weiss et al. |
| 5,947,238 A | 9/1999 | Jolly et al. |
| 5,967,273 A | 10/1999 | Hampton |
| 5,985,168 A | 11/1999 | Phule |
| 5,993,358 A | 11/1999 | Gureghian et al. |
| 6,068,249 A | 5/2000 | Shtarkman |
| 6,070,681 A | 6/2000 | Catanzarite et al. |
| 6,131,709 A | 10/2000 | Jolly et al. |
| 6,149,166 A | 11/2000 | Struss et al. |
| 6,151,930 A | 11/2000 | Carlson |
| 6,186,290 B1 | 2/2001 | Carlson |
| 6,318,522 B1 | 11/2001 | Johnston et al. ......... 188/267.2 |
| 2001/0054527 A1 * | 12/2001 | Card ....................... 188/267.1 |
| 2003/0019700 A1 * | 1/2003 | Wittig .................... 188/267.2 |

OTHER PUBLICATIONS

Article entitled, "Magnetorheological Fluid Based Torque Transmission Clutches," by Melek Yalcintas, 1999, pp. 563–569.

Article entitled, "Design Analysis and Experimental Evaluation of an MR Fluid Clutch," by Usob Lee, Dohyun Kim, Nahmkeon Hur and Doyoung Jeon, 2000, pp. 701–707.

* cited by examiner

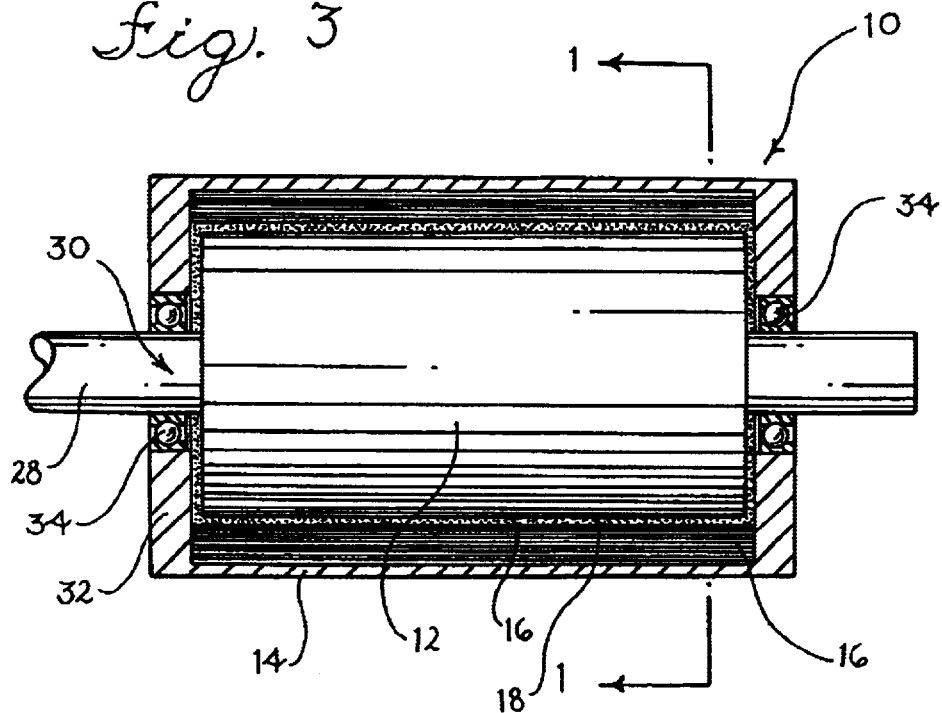
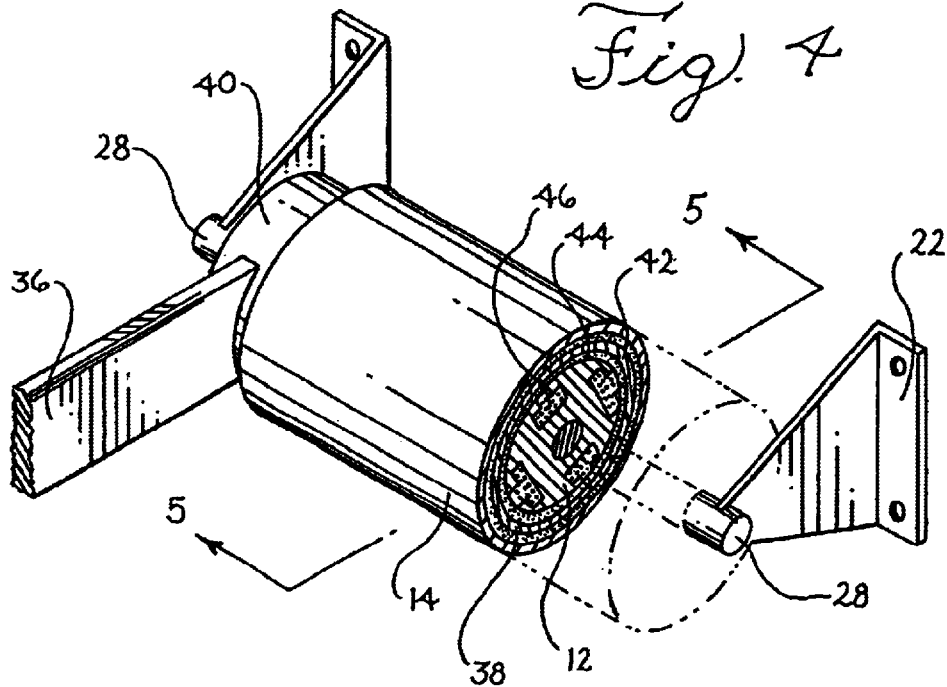

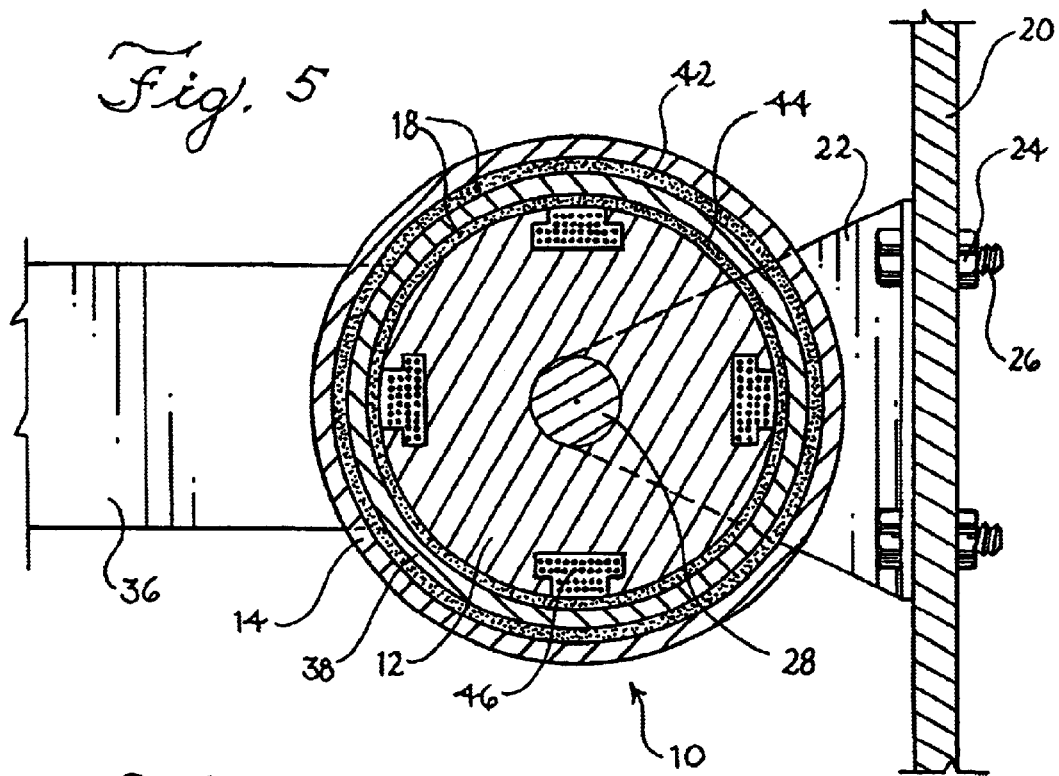
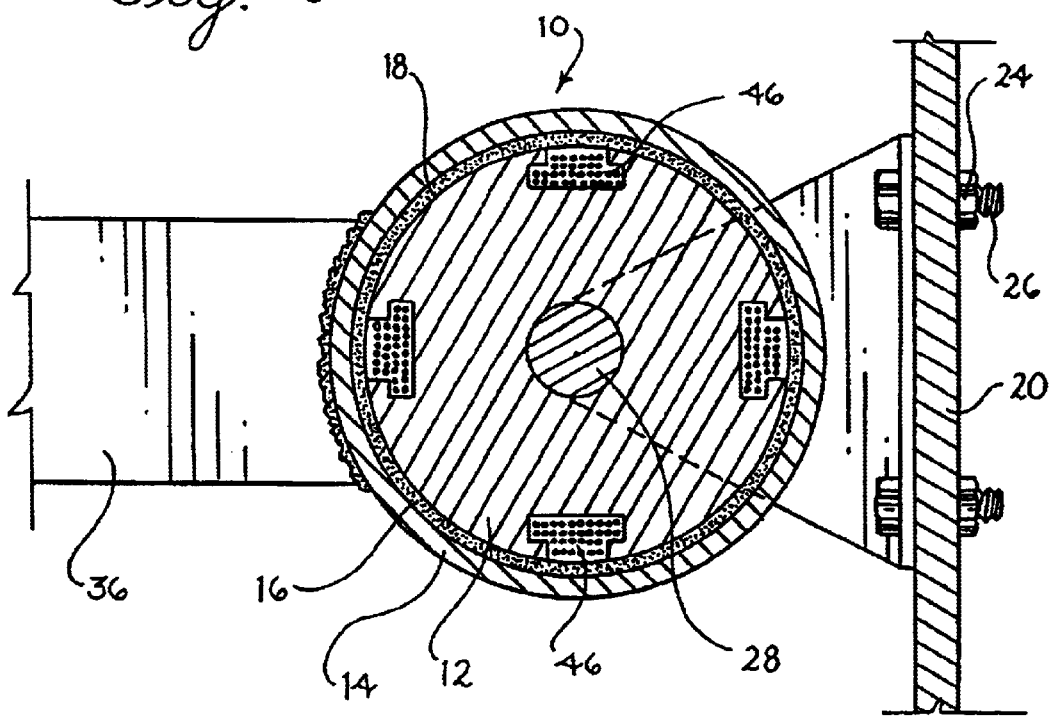

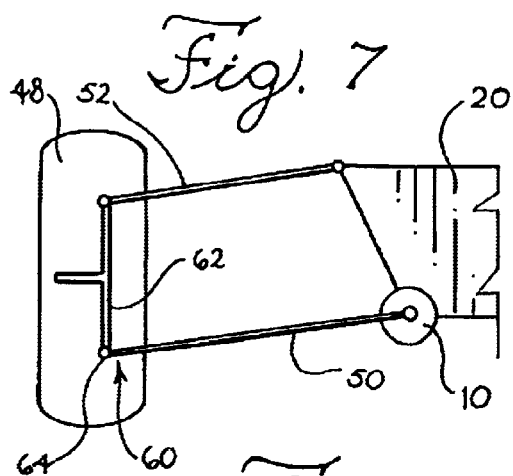
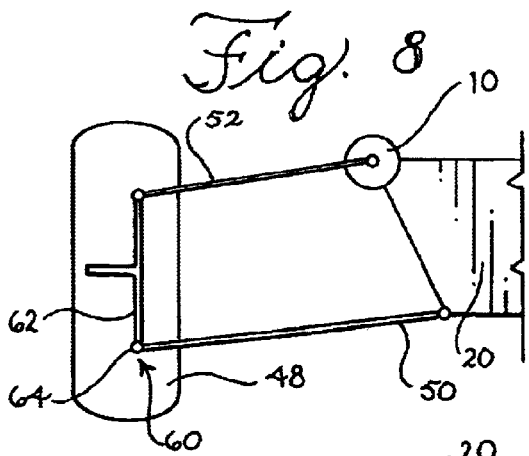
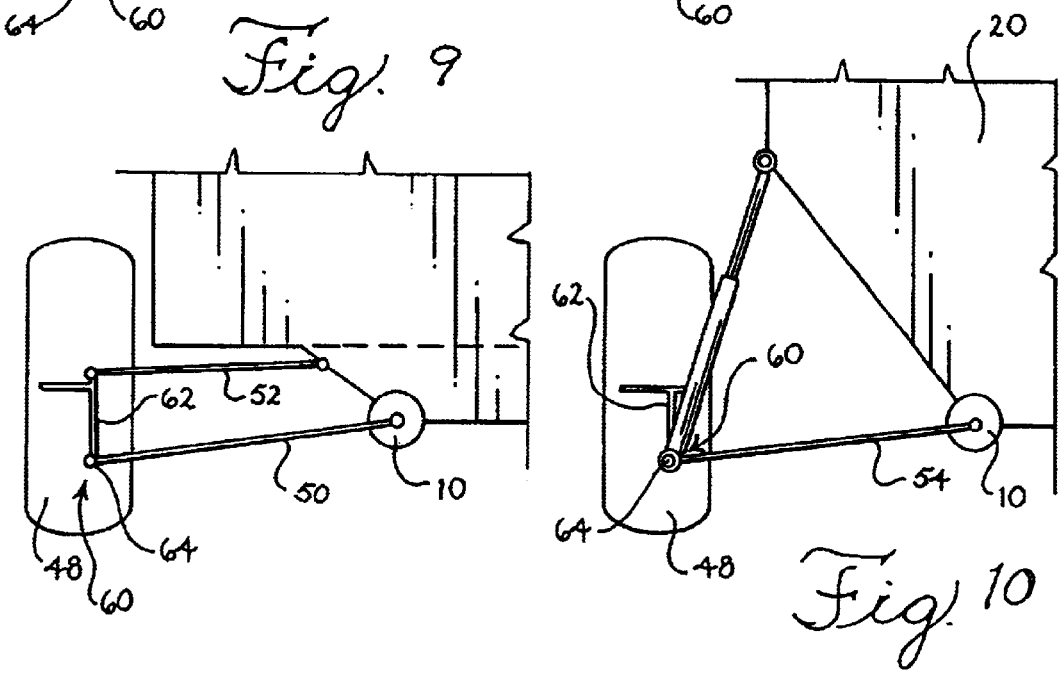
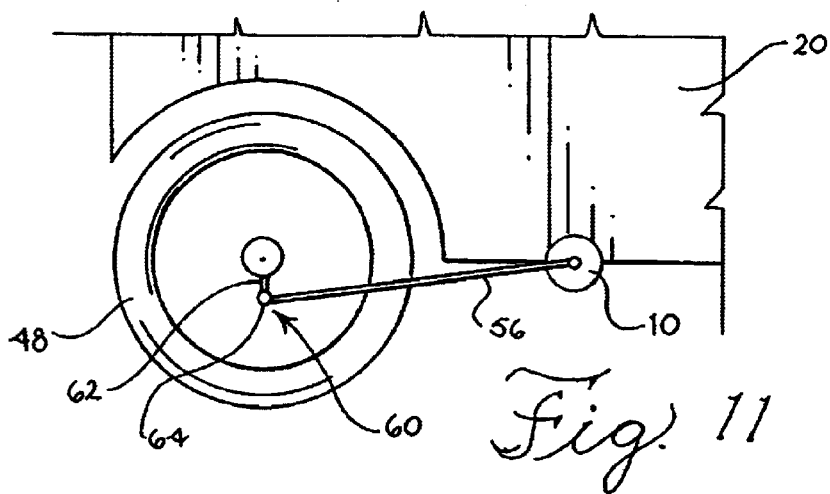

MAGNETORHEOLOGICAL FLUID-CONTROLLED VEHICLE SUSPENSION DAMPER

FIELD OF THE INVENTION

The invention relates generally to the field of suspension systems for vehicles. In particular, the invention relates to a magnetorheological fluid actuated damper for use in vehicular suspension systems.

DESCRIPTION OF THE RELATED ART

Suspension systems are used in modern vehicles to tune the characteristics of the ride and handling of the vehicle. The suspension system in each type of vehicle is matched to the type of ride that the operator of that vehicle would prefer. Some vehicles have suspension systems that provide a smoother ride than others and some vehicles have tighter, more precise handling characteristics. More modern suspension systems often allow an operator to choose the type of ride for the vehicle. For example, an operator might desire a "softer" ride when driving over rougher terrain and a "harder" ride with more precise handling when driving on smooth terrain.

A magnetorheological ("MR") fluid is a substance that relies on a magnetically capable media compounded in a way that allows the substance to change form from a liquid state to a more viscous state. In one form, an MR fluid has a viscosity and consistency much like common motor oil. When a magnetic field is applied, however, the fluid changes form, becoming more resistant to shear force. This increase in viscosity results from a dipole moment introduced into magnetic particles suspended in the fluid from the magnetic field. The particles form chains, aligning in parallel to the magnetic field. The increase in viscosity depends on the strength of the field applied to the fluid and the size and quantity of the particles. This change in viscosity of the fluid takes place within milliseconds.

Because of the capability to change viscosity quickly and easily, MR fluids have been used to provide adjustable resistance in many types of systems. For example, U.S. Pat. No. 5,816,372 discloses a system for use in an exercise machine to control the resistance in exercise equipment. The system includes a spinning rotor within a housing and an MR fluid in place between the rotor and the housing. In order to increase the resistance a user feels while exercising, a magnetic field is applied to the MR fluid and the increased viscosity of the MR fluid makes it more difficult to rotate the rotor. A similar system is disclosed in U.S. Pat. No. 6,186,290 for use as a braking system.

MR fluids have also been used in telescopic dampers in vehicles. A telescopic damper can be filled with MR fluid to provide adjustable resistance to the vertical movement of the wheel of a vehicle. A telescopic damper utilizing MR fluid requires a substantial amount of MR fluid to be viable and a large magnetic field to operate. Another type of damper utilizing MR fluid is a rotary shock absorber of the type disclosed in U.S. Pat. Nos. 4,942,947 and 5,257,681. This type of shock absorber allows the dampening of relative movement between a blade attached to a shaft in connection with a wheel of a vehicle, and the housing around the blade. The system provides a means to apply an adjustable magnetic field to an MR fluid in the housing to control the movement of the blade in relation to the housing. It is desirable to further increase the adjustability of this type of vehicular dampening system while minimizing the cost of the system.

BRIEF SUMMARY OF THE INVENTION

In one embodiment of the present invention, a magnetorheological fluid actuated damper is provided. At least a first and a second cylinder with the first cylinder positioned axially within the second cylinder are provided. A gap is formed between the cylinders. The second cylinder is mounted to a stationary mount of the vehicle chassis and a control arm is mounted at an end of the first cylinder. The first cylinder is mounted on bearings to allow it to rotate relative to the chassis. The gap between the cylinders contains a magnetorheological fluid having an adjustable viscosity in reaction to the application of a magnetic field. A magnetic field is generated over the fluid in the gap.

In a second embodiment of the present invention, a magnetorheological fluid actuated damper is provided. At least a first and a second concentric cylinder are provided and the first cylinder is mounted axially within the second cylinder so as to form a gap between the cylinders. The second cylinder is mounted to a stationary mount of a vehicle chassis and a control arm is mounted on an end of the first cylinder. The first cylinder is mounted on bearings to allow it to rotate relative to the chassis. The gap between the cylinders contains a magnetorheological fluid having an adjustable viscosity in reaction to the application of a magnetic field. A means for producing a magnetic field over the fluid in the gap is provided.

In a third embodiment of the present invention, a magnetorheological fluid actuated damper is provided. At least a first and a second concentric cylinder are provided and the first cylinder is mounted axially within the second cylinder so as to form a gap between the cylinders. The first cylinder is mounted to a stationary mount of a vehicle chassis and a control arm is mounted on an end of the second cylinder. The second cylinder is mounted on bearings to allow it to rotate relative to the chassis. The gap between the cylinders contains a magnetorheological fluid having an adjustable viscosity in reaction to the application of a magnetic field. A magnetic coil is in contact with at least one of the cylinders and the coil is attached to an electronic circuit allowing variation in current supplied to the coil to adjust the viscosity of the fluid.

In a fourth embodiment of the present invention, a magnetorheological fluid actuated damper is provided. At least three concentric cylinders defining gaps between them are provided. A first gap is defined between the first and the third cylinder and a second gap is defined between the second and the third cylinder. The third cylinder is mounted on bearings to allow rotation of the third cylinder relative to the first and second cylinders. The third cylinder is attached to a first end of a control arm at an end of the third cylinder such that oscillation of the control arm causes the third cylinder to rotate relative to the first and second cylinders. The first and second gaps between the cylinders are filled with a magnetorheological fluid and a coil capable of producing a magnetic field affecting at least one of the gaps to adjust the viscosity of the fluid is provided.

In a fifth embodiment of the present invention, a method for adjustably dampening the suspension system of a vehicle through the use of a magnetorheological fluid actuated barrel damper is provided. The method includes the steps of providing at least a first and a second concentric cylinder and positioning the first cylinder axially within the second cylinder so as to create a gap between the cylinders. A magnetorheological fluid is provided in the gap and the desired level of dampening is determined. Feedback is read from sensors on the vehicle and the viscosity of the fluid is controlled through the application of a magnetic field on the fluid such that the resistance to rotation of the rotatable cylinder changes in response to the change in viscosity of the fluid.

BRIEF DESCRIPTION OF SEVERAL VIEWS OF THE DRAWINGS

FIG. 3 is a cross-sectional view along line 3—3 in FIG. 1;

FIG. 4 is a perspective view of an alternative embodiment of the present invention;

FIG. 5 is a cross-sectional view along line 5—5 in FIG. 4;

FIG. 6 is a cross-sectional view of another alternative embodiment of the present invention;

FIG. 7 is a schematic view of the positioning of the present invention on the lower control arm of a double-wishbone suspension system;

FIG. 8 is a schematic view of the positioning of the present invention on the upper control arm of a double-wishbone suspension system;

FIG. 9 is a schematic view of the positioning of the present invention on the lower control arm of a double wishbone suspension system in a low floor installation;

FIG. 10 is a schematic view of the positioning of the present invention on the upper control arm of a strut suspension system;

FIG. 11 is a schematic view of the positioning of the present invention on the trailing arm of a solid axle suspension system;

DETAILED DESCRIPTION OF THE PREFERRED EMBODIMENTS OF THE INVENTION

Figure 1:
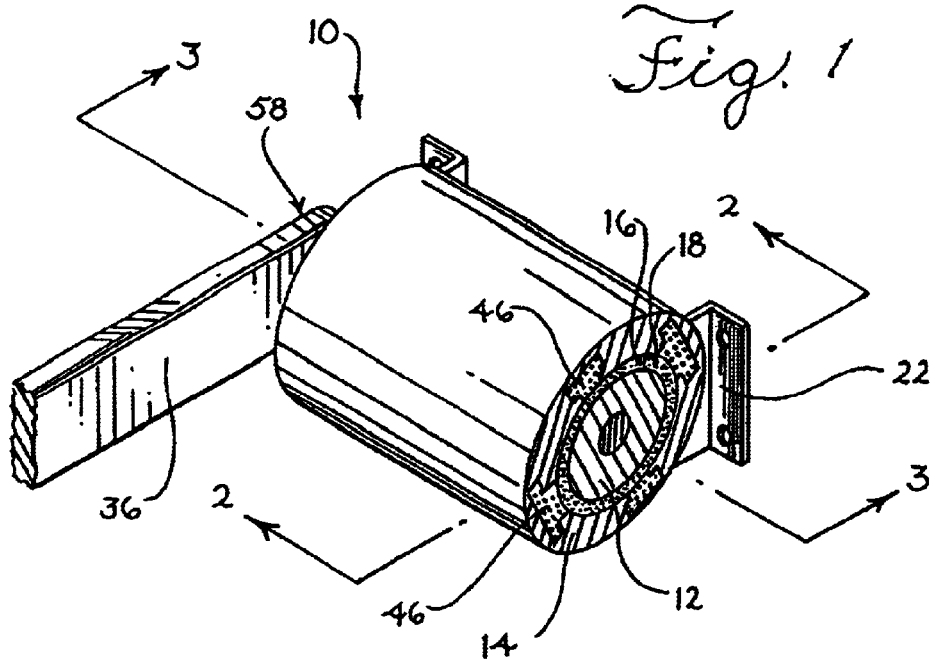
FIG. 1 is a perspective view of an embodiment of the present invention.
Figure 2:
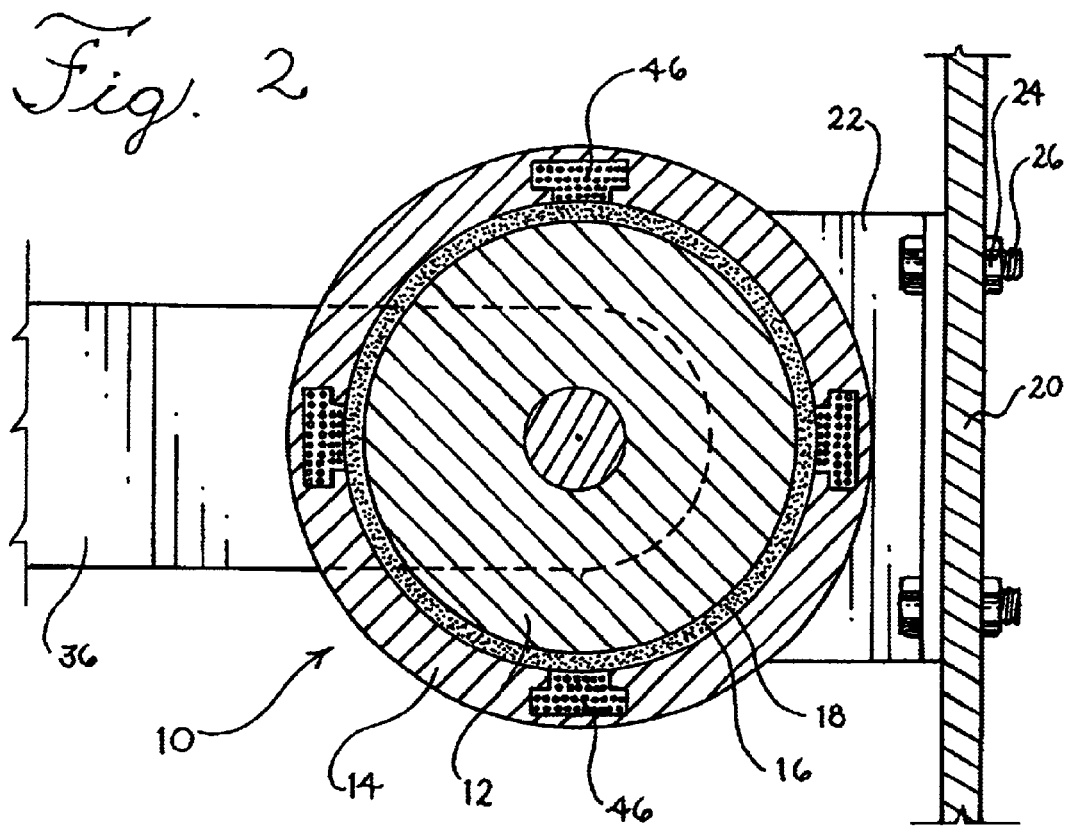
FIG. 2 is a cross-sectional view along line 2—2 in FIG. 1.

Referring in combination to FIGS. 1–3, a preferred embodiment of the MR-actuated damper 10 of the present invention is shown. First 12 and second 14 cylinders are provided. The second cylinder 14 preferably has a hollow interior that is shaped and sized to be slightly larger than the outer diameter of the first cylinder 12. The first cylinder 12 is positioned inside the hollow interior of the second cylinder 14 such that the first cylinder 12 and the second cylinder 14 are spaced apart from each other.

The positioning of the first cylinder 12 inside the second cylinder 14 forms a gap 16 between the first 12 and second cylinders 14. This gap 16 is preferably filled with an MR fluid 18. The damper 10 is preferably sealed at a side wall 32 of the second cylinder 14 so that the MR fluid 18 does not leak out of the damper 10. Since the gap 16 is preferably substantially thin, only a small volume of MR fluid 18 is required to fill the entire gap 16. The small MR fluid 18 requirement of the present invention reduces the cost of the damper 10 and also reduces the necessary strength of the seal in the damper 10.

In the embodiment of the present invention shown in FIGS. 1–3, the second cylinder 14 is preferably attached to the chassis 20 of the vehicle. The preferred mounting method shown in the Figures includes a standard bracket 22 welded to the second cylinder 14 and attached to the chassis 20 by nuts 24 and bolts 26. Other attachment methods are possible. For example, the second cylinder 14 could be attached to the chassis utilizing any method known in the art. The attachment method should prevent any movement or rotation of the second cylinder 14 such that the second cylinder 14 acts as a stator.

In the embodiment of the present invention shown in FIGS. 1–3, the first cylinder 12 includes a shaft 28 extending from the interior of the cylinder 12. The shaft 28 preferably extends through a hole 30 in the side wall 32 of the second cylinder 14. Bearings 34 are preferably provided in contact with the shaft 28 of the first cylinder 12 to allow the first cylinder 12 to rotate relative to the second cylinder 14 while holding the first cylinder 12 in place within the second cylinder 14. The first cylinder 12 preferably does not contact the second cylinder 14.

The shaft 28 preferably attaches to a control arm 36 of the suspension system. The movement of the control arm 36 rotates the first cylinder 12 relative to the second cylinder 14. The movement of the control arm 36 will be further explained in reference to FIGS. 7–11, which show the damper 10 mounted in various locations in the suspension system of a vehicle.

It is also possible to reverse the mounting arrangement of the first 12 and the second 14 cylinders. FIG. 6 shows an alternate embodiment of the present invention wherein the first cylinder 12 is mounted to a bracket 22 attached to the chassis 20 of the vehicle. As noted previously, the method of attachment shown is exemplary. The second cylinder 14 is attached to a control arm 36 of the suspension system. The gap 16 between the first 12 and second cylinders 14 is filled with MR fluid 18. In this embodiment, the second cylinder 14 rotates relative to the first cylinder 12, which acts as the stator. The rotation of the second cylinder 14 is created through the movement of the control arm 36.

It is also possible to create a stacked arrangement utilizing the present invention. In FIGS. 4 and 5, a stacked arrangement of the present invention is shown. In a stacked arrangement, three concentric cylinders 12, 14, 38 are provided. The second cylinder 14 preferably has the largest diameter and is mounted to the chassis 20 such that it cannot rotate and acts as a stator. The second cylinder 14 has a hollow interior. The third cylinder 38 also has a hollow interior and is positioned axially within the second cylinder 14 such that the third 38 and second 14 cylinders are not in contact with each other. The third cylinder 38 is preferably longer than the first 12 and the second 14 cylinders and has a section 40 that extends past the side walls 32 of the second cylinder 14. The third cylinder 38 is mounted on bearings (not shown) located in the side of the second cylinder 14 in a similar manner as in the embodiment of the present invention shown in FIG. 3. This configuration allows the third cylinder 38 to rotate in reaction to the movement of the control arm 36. The first cylinder 12 has a smaller diameter than the third cylinder 38 and has a shaft 28 extending from it. The shaft 28 attaches the first cylinder 12 to the chassis 20 such that the first cylinder 12 cannot rotate. In this embodiment, the third cylinder 38 rotates relative to the first 12 and second 14 cylinders.

The positioning of the third cylinder 38 between the first 12 and the second cylinders 14 creates a first gap 42 and a second gap 44. Both the gaps 42, 44 are filled with an MR fluid 18. The stacked arrangement of this damper 10 allows for an even greater amount of dampening control while still utilizing a small volume of MR fluid 18 due to the greater surface area of the first 12 and second 14 cylinders in contact with the MR fluid 18.

The adjustable resistance of the damper 10 of the present invention will now be described with reference to the embodiment shown in FIGS. 1–3. It is important to recognize that the invention operates in the same manner regardless of which cylinder acts as the stator and which is rotatable. The damper's 10 method of operation is not necessarily dependent on the number of cylinders in the embodiment.

The viscosity of the MR fluid 18 between the cylinders 12, 14 of the damper 10 can be easily adjusted. In its resting form, the MR fluid 18 has a consistency similar to motor oil and allows the first cylinder 12 to rotate relative to the second cylinder 14 with relatively small resistance. This allows the control arm 36 to move freely, with minimal resistance from the damper 10. The viscosity of the MR fluid 18 is adjusted by the application of a magnetic field to the MR fluid 18. When a magnetic field is applied to the MR fluid 18, the viscosity of the MR fluid 18 increases and the MR fluid 18 becomes thicker, taking on a consistency similar to a paste. This thicker consistency creates more resistance on the first cylinder 12 and makes it necessary to apply more force to the control arm 36 in order to rotate the first cylinder 12. This increased resistance to rotation results in a higher dampening level and less "give" for the control arm 36. Typically, higher performance vehicles use higher dampening levels to achieve improved handling and precision.

In order to change the viscosity of the MR fluid 18, a means for supplying a magnetic field must be provided. Preferably, a magnetic coil comprised of solenoid windings 46 is in place within one of the cylinders 12, 14, 38. FIGS. 1 and 2 show an embodiment of the present invention with solenoid windings 46 in place in the interior of the second cylinder 14. It is also possible to place the solenoid windings 46 around the outer diameter of the second cylinder 14. FIGS. 4–6 show embodiments of the present invention with the solenoid windings 46 in place in the interior of the first cylinder 12. It is also possible to position the solenoid windings in the interior of the third cylinder 38. Regardless of the placement of the solenoid windings 46, the windings 46 are preferably attached to an electronic circuit (not shown). The circuit allows a variable current to be supplied to the solenoid windings 46, which in turn allows the creation of variable magnetic fields. The strength of the magnetic field affects the viscosity of the MR fluid 18. The stronger the magnetic field, the higher the viscosity of the MR fluid 18. At higher viscosities, more force must be applied to the control arm 36 to rotate the rotatable cylinder.

Figure 12:
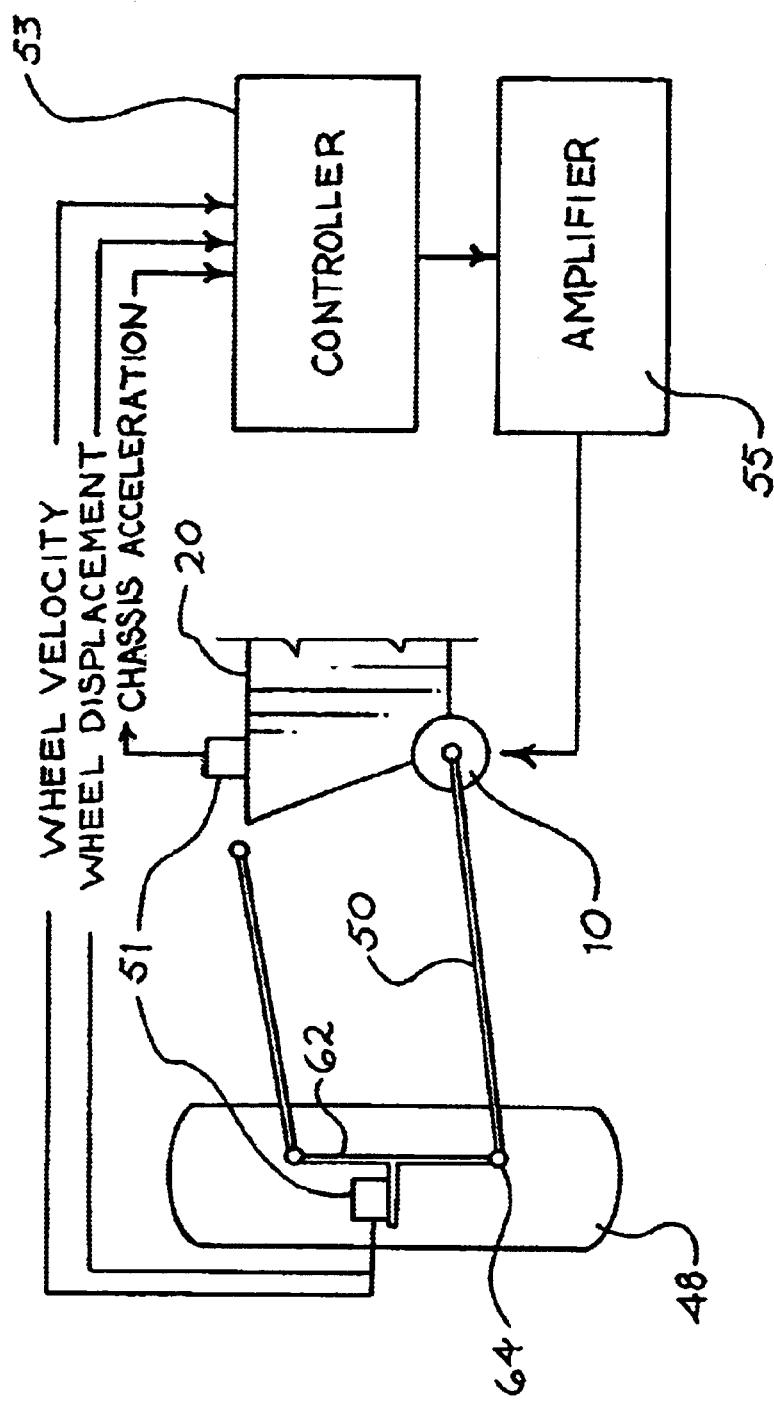
FIG. 12 is a schematic view of an example of a control system for use with the present invention.

Referring to FIG. 12, a schematic depiction of a simple control system is shown. The circuit is preferably connected to a controller 53 in the vehicle that controls an amplifier 55 capable of varying the current in response to the relative motion between the wheel 48 of the vehicle and the chassis 20 in real time. Sensors 51 are utilized to measure the wheel 48 velocity, wheel 48 displacement and chassis 20 velocity. These measurements are communicated to the controller 53. The sensors 51 provide feedback to the controller 53 that in turn activates an amplifier 55 to adjust the current supplied to the solenoid windings 46 to adjust the damping force of the damper 10. As these forces change, the controller 53 measures the velocity and displacement of the wheel 48 and the acceleration of the chassis 20 and the amplifier 55 continuously adjusts the magnetic field supplied by the solenoid windings 46. The adjustment of the current allows the damper 10 to control the damping force as a function of relative speed. The continuously controllable damping force supplied by the damper 10 of the present invention allows the handling and ride of the vehicle to be optimized in real time. Other computerized control and sensing systems known in the art can be added to further optimize the damping system and allow more operator control.

The damper 10 of the present invention can be mounted in the suspension system of a vehicle in any number of ways known in the art. FIGS. 7–11 illustrate schematic examples of preferred placements of the damper 10. The stationary cylinders may be attached to the chassis 20 in any manner known in the art. These figures are exemplary only. FIGS. 7–9 show the damper 10 of the present invention mounted in a short-long arm ("SLA") or double-wishbone suspension system. The damper 10 of the present invention may be installed on the long arm 50 of the SLA suspension system as shown in FIG. 7 or the short arm 52, as shown in FIG. 8. The damper 10 is more effective if it is positioned on the short arm 52, but it can still operate effectively on the long arm 50. It is also possible to mount the damper 10 of the present invention in a low floor SLA installation, as shown in FIG. 9. The damper 10 of the present invention may also be installed on the control arm 54 of a strut system, as shown in FIG. 10. FIG. 11 shows the damper 10 of the present invention installed on the trailing arm 56 of a solid axle suspension system. In any installation, the control arm is attached to the rotatable cylinder of the damper 10 at a first end 58 of the control arm. The second end 60 of the control arm is preferably attached to the knuckle 62 of the wheel 48 at a pivot point 64. The pivot point 64 is commonly a ball joint or a bushing, but may be any pivotable connection known in the art. The vertical movement of the wheel 48 causes the control arm to oscillate and to rotate the rotatable cylinder of the damper 10.

Figure 13:
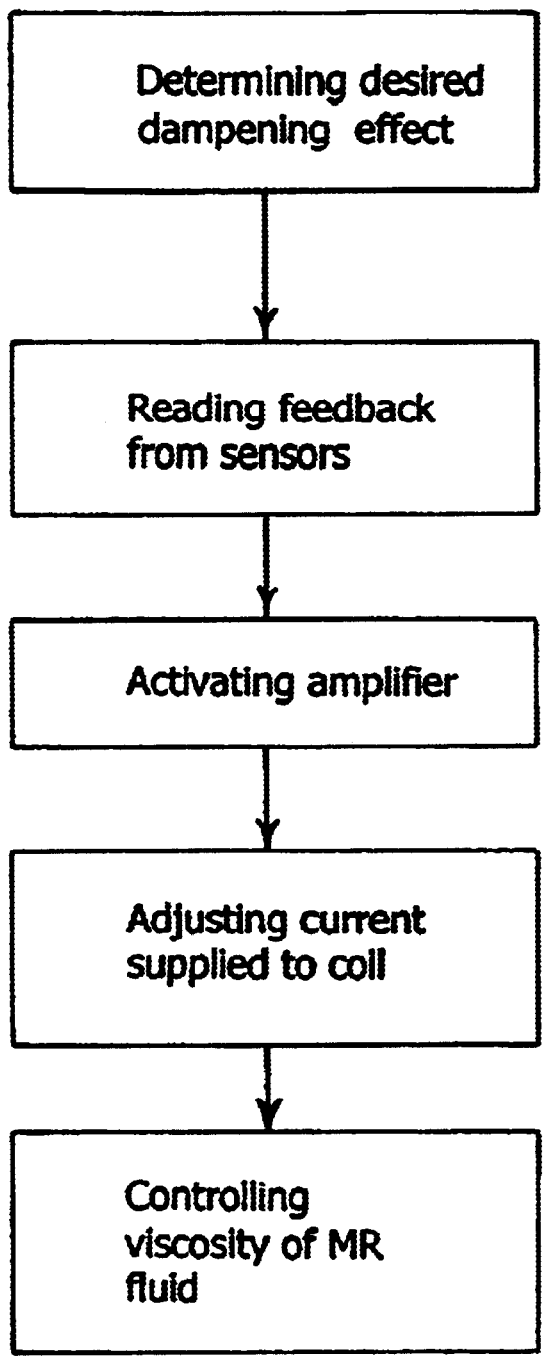
FIG. 13 is a flow chart showing the steps of the method of the present invention.

Another embodiment of the present invention, a method for adjustably dampening the suspension system of a vehicle through the use of an MR fluid actuated damper 10, is shown in FIG. 13 as a flowchart. The method includes the steps of providing a damper 10 having an arrangement of concentric cylinders 12,14 as previously described. A second cylinder 14 is attached to the chassis 20 of the vehicle so that it cannot rotate and the first cylinder 12 is mounted in bearings 34 such that it can rotate relative to the second cylinder 14. The first cylinder 12 is attached to a control arm 36 of the vehicle's suspension system such that the vertical movement of the wheel 48 of the vehicle causes the control arm 36 to oscillate and rotate the first cylinder 12. An MR fluid 18 is provided in the gap 16 between the cylinders 12,14. The method includes the step of first determining the desired dampening effect. The controller 53 reads the feedback from the sensors 51 and activates the amplifier 55. The amplifier 55 adjusts the current supplied to the solenoid windings 46 which creates a magnetic field. An increase in the magnetic field causes the viscosity of the MR fluid 18 to increase such that the resistance to rotation of the first cylinder 12 changes in response to the change in viscosity. Increasing the viscosity of the MR fluid 18 increases the force necessary to rotate the first cylinder 12 and decreasing the viscosity of the MR fluid 18 decreases the force necessary to rotate the first cylinder 12.

The MR fluid actuated damper 10 of the present invention provides many advantages over traditional telescopic dampers that utilize controllable fluids. The damper 10 of the present invention allows a control system to continuously vary the damping force in real time, resulting in a smoother ride with precise handling capabilities when necessary. The present invention also allows for improved packaging space, as shown in the low floor SLA installation in FIG. 9. This installation does not intrude into the cargo space of the vehicle. The installation of a traditional telescopic damper restricts the cargo space of the vehicle by requiring either the floor to be higher or the trunk width to be narrower to accommodate the telescopic damper, much like the arrangement shown in FIG. 10. The damper 10 of the present invention also replaces an inboard pivot point of the suspension system with a low friction device, unlike the ball joints or bushings used in traditional pivot points 64. The friction between the parts in traditional pivot points 64 causes more wear on them and they need to be replaced more often than a damper 10 of the present invention. The damper 10 of the present invention also requires less MR fluid than telescopic dampers utilizing MR fluid. Less than half of the amount of MR fluid is required in the damper of the present invention compared with telescopic dampers because of the increased surface area in the cylinders in contact with the MR fluid. This increased surface area also provides improved cooling characteristics over telescopic dampers. The internal MR fluid pressure in the damper 10 of the present invention is also much lower than in a telescopic damper, and this reduces sealing problems common in telescopic, fluid-controlled dampers. The frictionless aspect of the damper 10 of the present invention results in less wear on the damper 10, unlike the rod and bore wear that is common in telescopic dampers.

It should be noted that there could be a wide range of changes made to the present invention without departing from its scope. For example, the size and thickness of the cylinders could be varied to match the specifications of the vehicle in which the damper 10 is installed. It is also possible to stack more than three cylinders together in order to increase even further the controllability of the damper 10. Other control systems could be used along with different sensing systems to control the viscosity of the MR fluid and thus the damping characteristics of the damper 10. The damper 10 of the present invention could be mounted in suspension systems other than the examples pictured and could be mounted through the use of different attachment methods known in the art. Thus, it is intended that the foregoing detailed description be regarded as illustrative rather than limiting and that it be understood that it is the following claims, including all equivalents, which are intended to define the scope of the invention.

What is claimed is:

1. A magnetorheological fluid actuated damper, said damper comprising:

at least a first cylinder and a second concentric cylinder, said first cylinder being positioned axially within said second cylinder, so as to form a gap between said cylinders;

said second cylinder being mounted to a stationary mount of a vehicle chassis;

a control arm mounted at an end of said first cylinder;

said first cylinder being mounted on bearings to allow rotation of said first cylinder relative to said chassis;

said gap between said cylinders containing a magnetorheological fluid having adjustable viscosity in reaction to the application of a magnetic field; and a magnetic field generated over said fluid in said gap.

2. The magnetorheological fluid actuated damper of claim 1, wherein said second cylinder is unable to rotate.

3. The magnetorheological fluid actuated damper of claim 2, wherein oscillation of said control arm causes said first cylinder to rotate relative to said second cylinder.

4. The magnetorheological fluid actuated damper of claim 3, wherein said magnetic field is generated by a coil.

5. The magnetorheological fluid actuated damper of claim 4, wherein said coil is in contact with at least one of said cylinders and said coil is attached to an electronic circuit allowing variation in current supplied to said coil to adjust the viscosity of said magnetorheological fluid.

6. A magnetorheological fluid actuated damper, said damper comprising:

at least a first cylinder and a second concentric cylinder, said first cylinder being positioned axially within said second cylinder, so as to form a gap between said cylinders;

said second cylinder being mounted to a stationary mount of a vehicle chassis;

a control arm mounted at an end of said first cylinder;

said first cylinder being mounted on bearings to allow rotation of said first cylinder relative to said chassis;

said gap between said cylinders containing a magnetorheological fluid having adjustable viscosity in reaction to the application of a magnetic field; and a means for producing a magnetic field over said fluid in said gap.

7. The magnetorheological fluid actuated damper of claim 6, wherein said means for producing a magnetic field is a coil attached to an electronic circuit allowing variation in current supplied to said coil.

8. A method for adjustably dampening the suspension system of a vehicle through the use of a magnetorheological fluid actuated barrel damper, said method comprising the steps of:

providing at least a first cylinder and a second cylinder so as to create a gap between said cylinders where one of said cylinders is attached to the chassis of said vehicle such that said one cylinder cannot rotate;

providing a magnetorheological fluid within said gap;

determining the desired level of dampening;

reading feedback from sensors on the vehicle; and controlling the viscosity of said magnetorheological fluid through the application of a magnetic field on said magnetorheological fluid such that the resistance to rotation of said damper changes in response to the change in viscosity of said magnetorheological fluid.

9. A method for adjustably dampening the suspension system of a vehicle through the use of a magnetorheological fluid actuated barrel damper, said method comprising the steps of:

providing at least a first cylinder and a second cylinder so as to create a gap between said cylinders where one of said cylinders is attached to the chassis of said vehicle such that said one cylinder cannot rotate and said cylinder not attached to the vehicle chassis is attached to a control arm of the suspension system of said vehicle such that said other cylinder can rotate relative to said stationary cylinder in reaction to vertical movement of a wheel of said vehicle;

providing a magnetorheological fluid within said gap;

determining the desired level of dampening;

reading feedback from sensors on the vehicle; and controlling the viscosity of said magnetorheological fluid through the application of a magnetic field on said magnetorheological fluid such that the resistance to rotation of said damper changes in response to the change in viscosity of said magnetorheological fluid.

10. The method of claim 9, wherein said step of applying said magnetic field is accomplished through the provision of an electric charge to a magnetic coil in close proximity to said magnetorheological fluid.

11. The method of claim 10, further comprising the step of adjusting the viscosity of said magnetorheological fluid by varying the electric charge supplied to said magnetic coil.

12. The method of claim 11, wherein increasing the viscosity of said magnetorheological fluid increases the force necessary to rotate said first cylinder.

13. The method of claim 12, wherein decreasing the viscosity of said magnetorheological fluid decreases the force necessary to rotate said first cylinder.

14. The method of claim 13, wherein the step of controlling the viscosity of said magnetorheological fluid is performed by a controller reading feedback from said sensors and activating an amplifier which controls the level of current supplied to said magnetic coil.

* * * * *